United States Patent [19]

Taylor et al.

[11] Patent Number: 5,725,077
[45] Date of Patent: Mar. 10, 1998

[54] FRICTION PADS FOR USE IN DISC BRAKES

[75] Inventors: Alfred J. Taylor, Heswall; Susan K. Taylor, Solihull; David A. Hubbard, West Kirby; Mahmoud Lotfipour, Stockport, all of England

[73] Assignees: Sab Wabco (Bromborough) Limited; Ferodo Limited, both of England

[21] Appl. No.: 605,161

[22] PCT Filed: Sep. 9, 1994

[86] PCT No.: PCT/GB94/01964

§ 371 Date: Mar. 6, 1996

§ 102(e) Date: Mar. 6, 1996

[87] PCT Pub. No.: WO95/07418

PCT Pub. Date: Mar. 16, 1995

[30] Foreign Application Priority Data

Sep. 9, 1994 [GB] United Kingdom ............. 9318764

[51] Int. Cl.$^6$ ............................................. F16D 69/00
[52] U.S. Cl. ................................. 188/251 A; 188/250 B
[58] Field of Search ........................... 188/218, 251 A, 188/250 B; 192/107 M, 149; 523/152–158; 428/329, 330

[56] References Cited

U.S. PATENT DOCUMENTS

| | | | |
|---|---|---|---|
| 3,434,998 | 3/1969 | Alduch et al. | 523/153 |
| 3,891,595 | 6/1975 | Birchall | 523/153 |
| 3,896,075 | 7/1975 | Longley | 523/153 |
| 4,438,004 | 3/1984 | Myers | 523/153 |
| 4,461,643 | 7/1984 | Kaufman | 523/153 |
| 4,465,796 | 8/1984 | Leroy et al. | 523/153 |
| 4,735,975 | 4/1988 | Iwata et al. | 523/153 |
| 5,122,550 | 6/1992 | Schmitt | 523/149 |
| 5,145,888 | 9/1992 | Gong et al. | 523/149 |

FOREIGN PATENT DOCUMENTS

| | | |
|---|---|---|
| 789987 | 1/1958 | United Kingdom . |
| 1 235 100 | 6/1971 | United Kingdom . |
| 1 406 411 | 9/1975 | United Kingdom . |
| 1 457 419 | 12/1976 | United Kingdom . |
| 2 000 793 A | 1/1979 | United Kingdom . |
| 2 020 673 A | 11/1979 | United Kingdom . |
| 2 268 502 A | 1/1994 | United Kingdom . |
| WO 92/08909 | 5/1992 | WIPO . |

*Primary Examiner*—Chris Schwartz
*Attorney, Agent, or Firm*—Nixon & Vanderhye

[57] ABSTRACT

A friction pad for a brake assembly including a backing plate having attached to it a pad of friction material containing at least 50% by weight of a ceramic material present in the form of relatively coarse particles of diameter 0.3 mm to 4 mm and a synthetic resin binder, together with a minor amount of a graphite lubricant and a minor amount of a ceramic material in the form of relatively fine particles in the size range 1 to 30 microns.

10 Claims, No Drawings

FRICTION PADS FOR USE IN DISC BRAKES

The present invention relates to a friction pad for use in a brake assembly.

In particular the present invention relates to a friction pad for use in a very high performance disc brake system wherein a large mass is required to be stopped on a large number of occasions from a relatively high speed, for example, a high speed passenger train.

BACKGROUND OF THE INVENTION

Generally high performance brake systems, particular railway brakes, fall into two basic categories. One category covers high speed installations with a low braked mass and relatively infrequent applications. The French TGV system falls into this category, general parameters being a speed of 300 Km/hr and a mass to be braked of 4000 Kgs. The required braking time is about 78 seconds with a peak braking power of 730 Kw/m$^2$, for the disc and 6 Mw/m$^2$ for the pad, the total energy absorbed being 14 mega Joules. The other category covers low speed installations with a high braked mass and frequent applications. Light rail and trams fall into this category, general parameters being a speed of 80 Km/hr and a braked mass of 9000 Kgs. The peak braking power is 770 Kw/m$^2$ for the disc and 3–5 Mw/m$^2$ for the pad, the total energy absorbed being 2.3 mega Joules. A typical stopping time for this category is about 23 seconds.

Friction pads for use in disc brakes generally take the form of a substantially planar backing plate to which a pad of friction material is secured. In operation, the pad is urged against the brake disc causing frictional engagement, the effect of which increases with the applied braking pressure. As a result, the friction material and the disc are subjected to heating. Where the frictional engagement is high and the relative rotational speed of the disc over the pad is also high, there is the possibility that the pad material will be prematurely worn away. Damage such as stress cracking due to the sequential heating and cooling of the braking disc may occur, especially where hot spots occur due to physical/ chemical unstable interaction at the interface between the friction pad and braking disc, this being dependent upon the disc, pad and installation design. An additional factor is the rate of wear of the brake disc itself. Attempts to re-formulate the friction material to reduce the rate of wear of the pad often have the effect of greatly increasing the rate of wear of the brake disc. This is particularly the case where the formulation includes increased levels of abrasive material intended to increase pad life. Accordingly, to dissipate the heat generated over a larger area of the brake disc and to thus reduce the likelihood of hot spots and attendant stress cracking, it has been proposed to utilize a brake disc with a ceramic surface, one such brake disc being disclosed in published PCT Patent Specification WO92/08909.

It is also known from DE-11-9114265 to employ barytes and magnesium oxide in powder form, together with up to 40 wt % of iron as ingredients of a non-asbestos friction material formulation.

Whilst a braking disc having a ceramic surface of this kind increases the performance of the brake disc as compared to conventional steel and/or sintered brake discs, as regards thermo-mechanical fatigue cracking defects, and whilst known friction pads can be used therewith, such known friction pads tend to prematurely wear away and do not provide the desired performance due to increased temperatures at the interface between the friction pad and the ceramic surface of the disc, as compared to the interface temperature between such a friction pad and a plain steel or an aluminium metal matrix composite disc.

It is a particular object of the present invention to provide a friction pad for use in a disc brake assembly wherein the brake disc has a ceramic material braking surface, the friction pad providing improved performance in respect of pad life and frictional grip on the ceramic surface brake disc.

DESCRIPTION OF THE INVENTION

According to the present invention a friction pad for use in a brake assembly comprises a backing plate having affixed thereto a pad of friction material comprised of at least 50% by weight of ceramic material.

According to a particularly preferred embodiment of the invention, a friction pad for use in a brake assembly comprises a backing plate having affixed thereto a pad of a friction material comprising at least 50% of a ceramic material present in the form of relatively coarse particles of diameter 0.3 mm to 4 mm and a synthetic resin binder together with a minor amount of a graphite lubricant and a minor amount of ceramic material in the form of relatively fine particles in the size range from 1 to 30 microns.

The friction pad of the present invention thus has a carbon content, and this is preferably in the range 5 to 20% by weight of the pad, a carbon content of 15% by weight being particularly preferred.

In a preferred embodiment of the present invention the ceramic material is comprised of ceramic oxide(s) which is/are preferably metal oxide ceramics.

Further, the composition of the pad of friction material may also include a resin modifier constituted by a minor amount of a polyamide resin, a pitch and/or bitumen material, to reduce the porosity of the ceramic structure and provide an amount of flexibility, thereby allowing the pad to deform slightly under braking without shearing at the edges. The resin modifier imparts toughness and provides extra support and energy absorption capability as well as extended oxidation protection for the resin and retained carbon. To further protect the graphite from oxidation, it has been found advantageous to include a minor amount of an antioxidant material such as metals and metal compounds with a relatively high affinity for oxygen. Examples of preferred materials include aluminium, silicon, magnesium, chromium, molybdenum, together with alloys thereof and metal carbides. The graphite lubricant is preferably present as flakes, these graphite flakes at least assisting in providing lubrication between the friction pad and the braking disc.

It has been found that in use a lubricant layer of graphite forms on the surface of the ceramic brake disc. This layer is beth very rapidly formed and essentially self-sustaining; it appears to play a highly significant role in maintaining a sensibly uniform coefficient of friction after the initial application of braking force between pad and disc. It appears virtually unaffected by successive applications of the brake.

The resin binder is selected to sustain the desired integrity and frictional performance for the friction pad at the maximum braking disc surface temperature for a particular installation. To explain, the resin binder will eventually degrade under the effect of braking disc and friction pad interface temperature, degradation taking place progressively from the working face of the pad through its thickness, dependent on the severity of the operating duty. However, while the resin at the surface of the friction pad may have degraded completely, the oxide matrix and resin beneath will still hold the structure together and so the pad will retain its friction capability. The formation of the graphite lubricant layer is particularly important in this context.

Preferably a pad of friction material suitable for use in the present invention includes primarily magnesium oxide as the ceramic material, possibly together with adventitious smaller quantities of various other metal oxide ceramics. Typically such a construction of the present invention will comprise the following ceramics in the percentage weight ranges given:

| | |
|---|---|
| MgO | 94.6% to 97.2% |
| CaO | 1.9% to 2.5% |
| $Al_2O_3$ | 0.2% to 0.6% |
| $Mn_3O_4$ | 0.03% to 0.07% |
| $Fe_3O_4$ | 0.2% to 1.0% |

As previously recited, the ceramic material is present as relatively coarse particles, but a minor amount of ceramic material is included as fine particles, typically in the range 1 to 30 microns. Where magnesium oxide is used as the coarse particles, the fine particles are preferably also of magnesium oxide, although as indicated above, minor amounts of other oxides may also be present. The presence of fine particle material helps to minimize the porosity of the pad, thereby improving its strength/integrity. Other finely powdered materials such as barytes (barium sulphate) may also be used as the finely powdered component, or as a part of it.

Preferred binder resins include phenolic resins, polyimide resins such as bismaleimide and a furane resin made from furfural or furfuryl alcohol. These have proved useful at brake disc surface temperatures up to 1600° C.

The present invention provides a long life friction pad for use in a disc brake assembly, the friction pad complementing a brake disc with a ceramic surface to optimise the life and performance both of the brake disc and the wear rate and performance of the friction pad used in conjunction with it.

Further, a friction pad constructed according to the present invention, and especially the preferred embodiments detailed earlier, can be used in braking systems which operate at at least twice the duty of high performance brakes referred to previously. For example, the friction pad of the present invention can operate at speeds of 350 Km/hr with a braked mass of 5000 Kgs and a target braking time of 84 seconds, the peak braking power being 1.2 Mw/m$^2$ for the disc and 6.7 Mw/m$^2$ for the pad, the total energy absorbed being 38 mega Joules. In fact friction pads according to the present invention can provide an overload capability of as great as 50 mega Joules.

EXAMPLE

In order that the invention be better understood, a preferred embodiment of it will now be described by way of example.

A disc brake pad was made by compounding the following ingredients to make a friction material.

| | |
|---|---|
| Phenolic resin | 6% by weight |
| Mineral fibre | 4% by weight |
| Coarse MgO | 52% by weight |
| Synthetic graphite | 1% by weight |
| Flake graphite | 9% by weight |
| Fine powdered ceramics (predominantly MgO) | 20% by weight |
| Metal fibres | 18% by weight |

This material was compression moulded into brake pads under a pressure of about 85 MN/m$^2$ (5.5 tsi), at ambient temperature. The pads were cured by heating at 200° C. for 3 hours, under relatively light pressure 138 KN/m$^2$ (20 psi). Bonding to steel backing plates was carried out during the compression moulding stage, using a combination of adhesive bending and mechanical keying to secure the pads to their respective plates.

A pair of pads and back plates were mounted in a brake assembly on a dynamometer, to run against opposite faces of a ceramic-faced brake rotor (disc). Instrumentation was provided to monitor the temperature of the rotor surface under ambient and braking conditions.

In operation, it was observed that a polished, smooth black film was formed on the rotor faces almost as soon as the brake was first applied. At this point, the coefficient of friction stabilised at about 0.3 and remained relatively constant, despite repeated operation of the brake causing the disc surface temperature to rise to over 1000° C. There was minimal wear to the brake disc; pad wear was naturally greater, but still well within acceptable limits. The overall performance was excellent.

It will be appreciated that although the present invention has been described with particular reference to use in a disc brake assembly, the invention is also applicable to other braking systems, specifically to brake blocks for use in a conventional brake system.

We claim:

1. A friction pad for use in a brake assembly comprising a backing plate having affixed thereto a pad of friction material comprising at least 50% by weight of a ceramic material present in the form of relatively coarse particles of diameter 0.3 mm to 4 mm and a synthetic resin binder, together with a minor amount of a graphite lubricant and a minor amount of a ceramic material in the form of relatively fine particles in the size range 1 to 30 microns.

2. A friction pad according to claim 1 wherein the friction material has a carbon content in the range 5 to 20% by weight.

3. A friction material according to claim 2 wherein the carbon content is 15% by weight.

4. A friction pad according to claim 1 wherein the coarse ceramic material comprises predominantly magnesium oxide.

5. A friction pad according to claim 4 wherein the fine ceramic material also comprises minor amount of one or more of calcium oxide (CaO), alumina ($Al_2O_3$), manganese oxide ($Mn_3O_4$) ferric oxide ($Fe_3O_4$), barium sulphate (Ba $SO_4$).

6. A friction pad according to claim 1 wherein the graphite lubricant is flake graphite.

7. A friction material according to claim 6 further comprising a minor amount of an antioxidant material.

8. A friction pad according to claim 1 wherein the resin binder is a phenolic resin, a polyimide resin or a furane resin.

9. A friction pad according to claim 1 wherein the friction material further comprises a resin modifier constituted by a minor amount of a polyamide resin, pitch or bitumen.

10. A friction pad according to any of claim 1 wherein said brake assembly is a disc brake assembly.

* * * * *